(No Model.)
S. STURGIS.
BRAKE FOR VEHICLES.
No. 355,355. Patented Jan. 4, 1887.
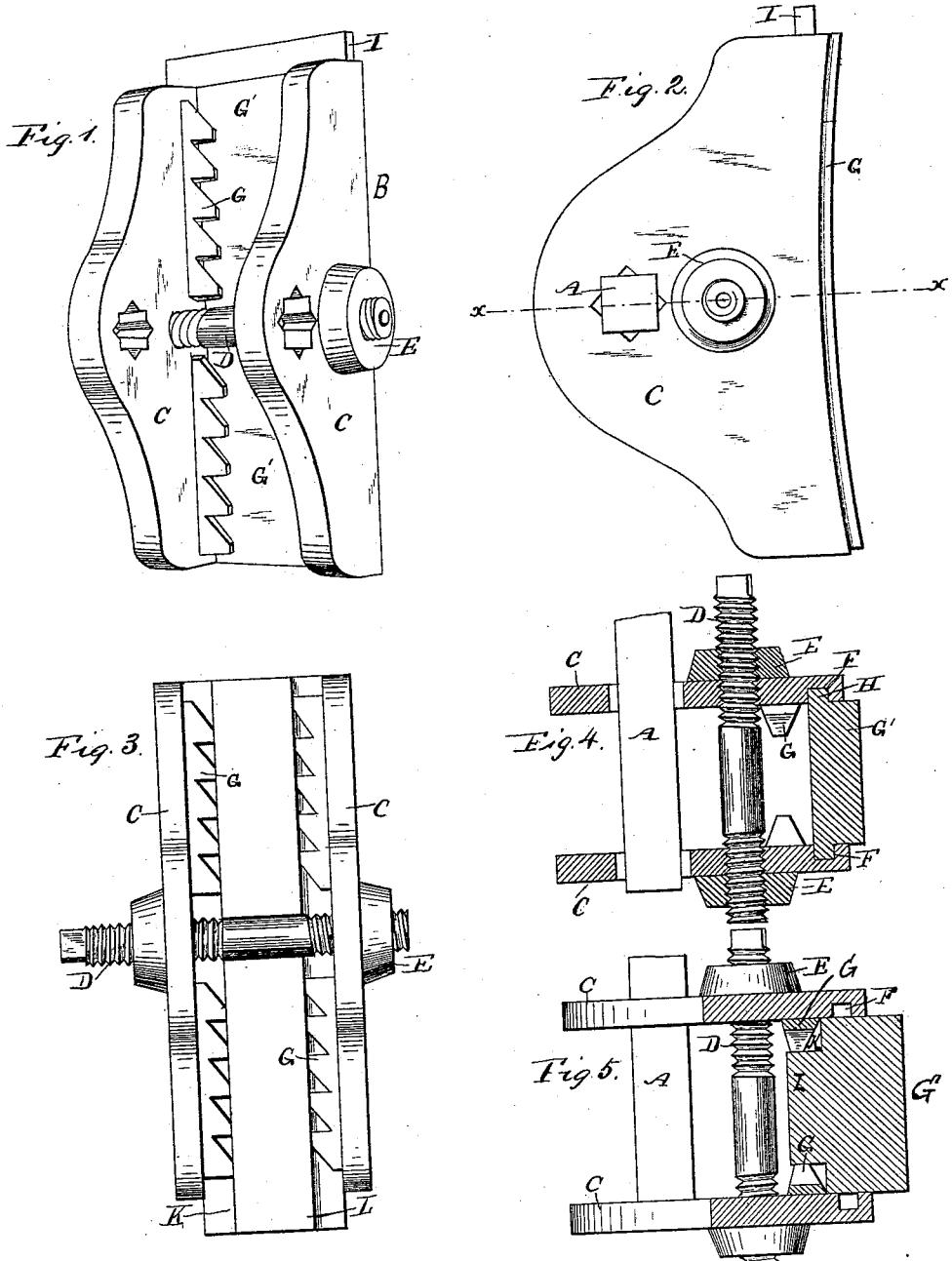
Witnesses
John H. Siggers
E. G. Siggers
Inventor
Samuel Sturgis
By his Attorneys
C. A. Knowles

UNITED STATES PATENT OFFICE.

SAMUEL STURGIS, OF MANAYUNK, PENNSYLVANIA.

BRAKE FOR VEHICLES.

SPECIFICATION forming part of Letters Patent No. 355,355, dated January 4, 1887.

Application filed September 8, 1886. Serial No. 213,031. (No model.)

*To all whom it may concern:*

Be it known that I, SAMUEL STURGIS, a citizen of the United States, residing at Manayunk, in the county of Philadelphia and State of Pennsylvania, have invented a new and useful Improvement in Brakes for Vehicles, of which the following is a specification.

My invention relates to an improvement in brakes for vehicles; and it consists in the peculiar construction and combination of devices, that will be more fully set forth hereinafter, and particularly pointed out in the claims.

In the drawings, Figure 1 is a perspective view of a device embodying my improvements, the brake-bar being omitted. Fig. 2 is an elevation of the same. Fig. 3 is a rear elevation of a modified form. Fig. 4 is a horizontal section taken on the line $x\ x$ of Fig. 2. Fig. 5 is a horizontal section of Fig. 3.

A represents the usual brake-bar, and B represents the brake-block, which is attached to the end of the brake-bar in the usual manner. The said brake-block comprises the two side plates, C, which are connected together by a transverse screw, D, the ends of which are provided with threads extending in opposite directions. The ends of the screw pass through threaded openings which are made at the centers of the plates C, near the rear edges thereof, and the said plates are provided with annular bosses E on the outer sides thereof, and the said bosses are provided with threaded openings which align with the threaded openings in the plates, and form a continuation thereof. The bosses are formed integrally with the plates C.

Near the rear edges of the plates C, on the insides thereof, are made curved grooves F, and in front of the said grooves are arranged series of teeth G, which are also on the inner opposing sides of the plates. The outer end of the screw D is squared, and thereby adapted to receive a wrench, by means of which the said screw may be turned. As the screw is provided at opposite extremities with right and left hand threads, it will be readily understood that by turning it in one direction the plates C will be caused to approach each other, and that by turning it in the contrary direction the said plates will be caused to recede from each other.

G' represents a rubber, which is adapted to bear against the periphery of the wheel. The said rubber is made of iron or other suitable metal, and is slightly curved longitudinally to correspond with the radius of the wheel and the contour of the rear edges of the plates C. The front side of the rubber is provided with tongues H, which project from its edges, and are adapted to enter the grooves F in the plates C. From the upper ends of the said tongues project lateral lugs or shoulders I, which bear upon the upper edges of the plates C, and prevent the rubber from being forced downwardly from between the plates C when the brake is applied to the wheel.

In Fig. 5 I show a modified form of rubber, which is made of wood instead of metal, and is provided on its front side, at its edges, with curved grooves K, thereby forming a tongue or shoulder, L, on the front side of the rubber. In order to attach this form of rubber to the brake-block, the plates C of the latter are moved from each other sufficiently far to permit the shoulder L of the rubber to be inserted between the teeth G of the plates, and the screw D is then turned so as to cause the plates C to approach each other and force the teeth G into opposite sides of the shoulder L, thereby firmly securing the rubber between the plates.

By providing both the grooves or ways F and the teeth G, I am enabled to have at hand at all times two methods of holding the brake-block, so that in case the metal block, as shown in Figs. 1, 2, and 4, becomes worn out or useless a piece of wood may be chopped out for temporary use as a brake-block to be held by the teeth G, as shown in Figs. 3 and 5.

I am aware that it is old to provide a brake-block consisting of two pivoted sections between which the rubber block is secured, and a screw connecting the sections; but in this case the screw was not a right and left hand screw, and, further, the pivoting of the sections or plates required the provision of means for supporting and forming the pivot for the plates or sections, which complicates the construction to an unnecessary extent.

I am also aware that it is old to construct a brake-block of two sliding sections having teeth and connected by a bolt and nut. This is not what I claim; but I am not aware that a brake-block has ever been constructed with grooves to receive tongues on the rubber block, nor provided with a right and left hand screw to connect the sections or plates, nor constructed with both teeth and grooves, whereby provision is at hand to secure a temporary rubber block when the metallic one with the tongues becomes worn or broken.

Having thus described my invention, I claim—

1. The brake-block comprising the plates C, the rubber block secured between the opposing sides of the plates, and the screw-bolt D, having right-hand threads at one end engaging one plate C and left-hand threads at the other end engaging the other plate C, as set forth.

2. As a new article of manufacture, the brake-block having its clamping-plates for the rubber provided with the groove F and the series of teeth G on the opposing sides of the plates, substantially as described.

In testimony that I claim the foregoing as my own I have hereto affixed my signature in presence of two witnesses.

SAMUEL STURGIS.

Witnesses:
  JOSEPH PRICE,
  HOMER PARSONS.